INVENTOR.
J.N. MORAN

ATTORNEYS

July 12, 1960 J. N. MORAN 2,944,287
APPARATUS FOR AND METHOD OF EXTRUDING PLASTIC MATERIALS
Filed Aug. 28, 1956 5 Sheets-Sheet 2

INVENTOR.
J. N. MORAN
BY *Hudson and Young*
ATTORNEYS

July 12, 1960  J. N. MORAN  2,944,287
APPARATUS FOR AND METHOD OF EXTRUDING PLASTIC MATERIALS
Filed Aug. 28, 1956  5 Sheets-Sheet 3

INVENTOR.
J. N. MORAN
BY
ATTORNEYS

July 12, 1960 J. N. MORAN 2,944,287
APPARATUS FOR AND METHOD OF EXTRUDING PLASTIC MATERIALS
Filed Aug. 28, 1956 5 Sheets-Sheet 4

INVENTOR.
J.N. MORAN
BY *Hudson and Young*
ATTORNEYS

July 12, 1960 J. N. MORAN 2,944,287
APPARATUS FOR AND METHOD OF EXTRUDING PLASTIC MATERIALS
Filed Aug. 28, 1956 5 Sheets-Sheet 5
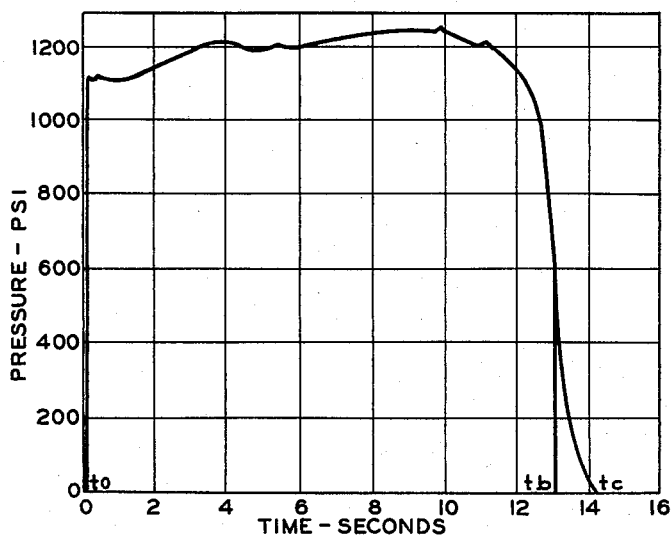
FIG. 10
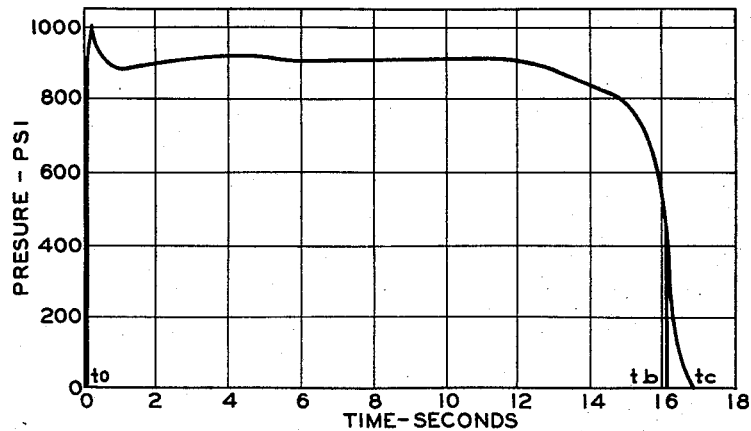
FIG. 9
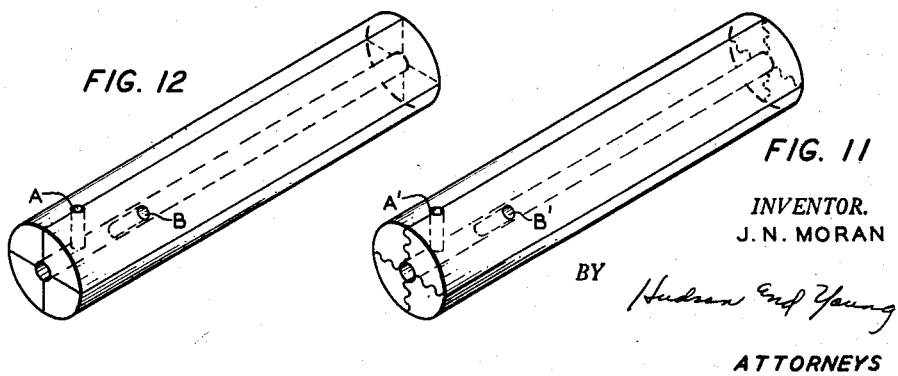
FIG. 12
FIG. 11
INVENTOR.
J. N. MORAN
BY
ATTORNEYS United States Patent Office 2,944,287
Patented July 12, 1960

2,944,287

APPARATUS FOR AND METHOD OF EXTRUDING PLASTIC MATERIALS

Jesse N. Moran, Waco, Tex., assignor to Phillips Petroleum Company, a corporation of Delaware Filed Aug. 28, 1956, Ser. No. 606,718

3 Claims. (Cl. 18—14)

This invention relates to apparatus for and a method of extruding plastic materials. In one aspect, this invention relates to apparatus for extruding a perforated propellant grain having a substantially uniform burning rate throughout the web portion thereof. In another aspect, this invention relates to a method for extruding a perforated propellant grain having a substantially uniform burning rate throughout the web portion thereof.

In the extrusion of plastic materials to produce tubular articles, the plastic material is extruded through a die having a mandrel positioned and held therein by means of a spider or stake holder. Said spider or stake holder comprises a plurality of arms extending radially from a hub, and a ring member connecting the ends of said arms. The mandrel is attached to the downstream end of the hub. The material being extruded is parted as it flows around the arms of the spider and reunites after passing said arms to form a straight line of cleavage.

The above-described apparatus and method are, in general, satisfactory for the extrusion of homogeneous materials. However, it has been found that when non-homogeneous propellant materials containing a dispersed oxidizer salt flow over a polished metal surface, such as the arms of the spider, the oxidizer particles in the propellant are oriented in such a way as to cause an increase in the propellant burning rate in the region of the cleavage line.

I have found that when non-homogeneous propellant materials are extruded through a die having a spider or stake holder having arms, the trailing or downstream edge of which are adapted to impart a uniform non-straight line of juncture in the reunited material, that the undesired increase in burning rate in the region of the cleavage line is substantially eliminated because the straight line of cleavage has been eliminated and replaced with a non-straight line of juncture. Thus broadly speaking, my invention comprises an improved perforated propellant grain having a substantially uniform burning rate throughout the web portion thereof, a method of forming said improved propellant grain, and an apparatus for forming said improved propellant grain.

An object of this invention is to provide an improved apparatus for and an improved method of extruding plastic materials. Another object of this invention is to provide an improved propellant grain having a substantially uniform burning rate throughout the web portion thereof. Another object of this invention is to provide a method of producing improved propellant grains having a substantially uniform burning rate throughout the web portions thereof. Still another object of this invention is to provide apparatus for producing an improved propellant grain having a substantially uniform burning rate throughout the web portion thereof. Another object of this invention is to provide an improved spider or stake holder having arms, the trailing or downstream edge of which are adapted to impart a uniform non-straight line of juncture in the material passed over said arms. Other aspects, advantages and objects of this invention will be apparent to those skilled in the art upon reading the accompanying disclosure.

As mentioned, when non-homogeneous propellant materials containing an oxidizer salt are extruded over the polished metal surfaces of a spider or stake holder, orientation of said oxidizer particles occurs. While the invention is not to be limited to any theories as to just how this orientation occurs, it is presently believed that said orientation is due to a "lining up" of at least a substantial portion of the particles of oxidizer with their longitudinal axes in a plane parallel to or in the same plane as the plane of the polished metal surfaces of the spider arm. Thus, when the material reunites after having passed over said arm, it reunites to form a straight line of cleavage, leaving a region on both sides of said cleavage line wherein the oxidizer particles are "lined up" or oriented. It is presently believed that this orientation results in some concentration, or at least has the same effect as increasing the concentration, of the oxidizer particles in the regions adjacent the line of cleavage so as to give an increase in burning rate at said line of cleavage. In my improved propellant grain having a substantially uniform burning rate throughout the web portion thereof, the increased burning rate in the region of the line of cleavage is eliminated because said line of cleavage has been eliminated and replaced with a uniform non-straight line of juncture. Thus, the effect of concentration of the oxidizer particles is overcome.

Thus according to the invention there is provided an improved perforated propellant grain having a substantially uniform burning rate throughout the web portion thereof, said propellant grain being prepared by extruding a propellant composition through a die chamber having a mandrel positioned and held therein by means of a spider comprised of a plurality of arm members extending radially from a hub, said arm members having an upstream edge and a rounded downstream edge and a plurality of tapered grooves in the lower portion of each side thereof extending from said rounded downstream edge to a point intermediate said upstream edge and said downstream edge.

When the parted propellant material reunites after passing the grooved arm of my spider or stake holder, it comes together in an interlocking manner to provide a non-straight line of juncture and the propellant grain has a substantially uniform burning rate throughout the web portion thereof as is shown by the examples given hereinafter.

Obtaining a uniform burning rate in a propellant grain is important in the performance of the motor or missile in which said grain is used. The improved propellant grain of the invention delivers more uniform thrust with a longer duration. Propellant grains prepared according to the invention have good mechanical properties such as high values of elongation and tensile strength, and low values of modulus of elasticity.

Figures 9 and 10 are firing trace diagrams (pressure v. time) of propellant grains prepared with and without (respectively) employing the spider or stake holder of the invention.

Figures 11 and 12 are a cross section of two perforated propellant grains showing the locations from which the strand specimens of Example I were taken.

Figure 1:
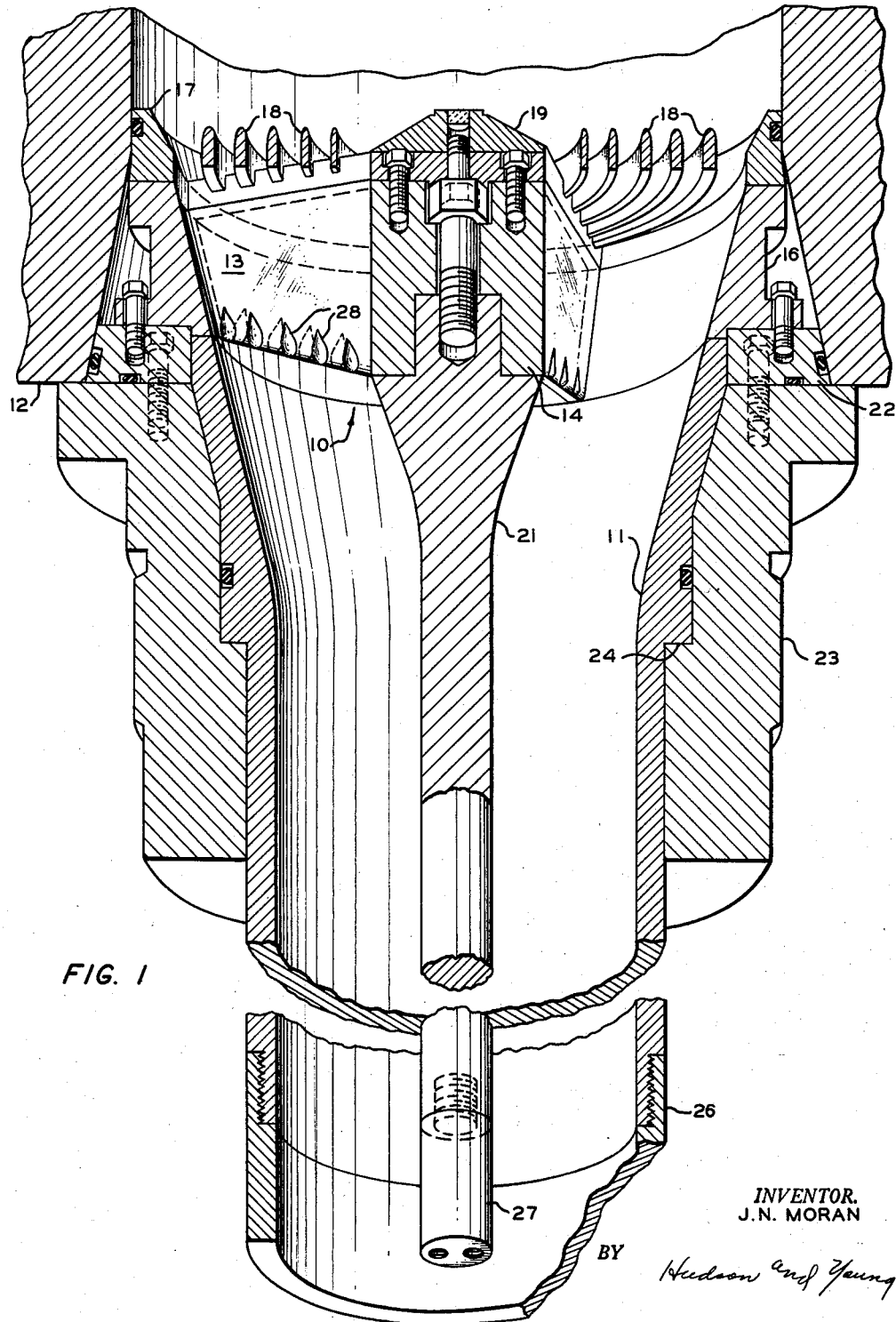
Figure 1 is a perspective view, partially in section, showing the spider of the invention positioned in a die at the outlet of the material chamber of an extrusion press.
Figure 7:
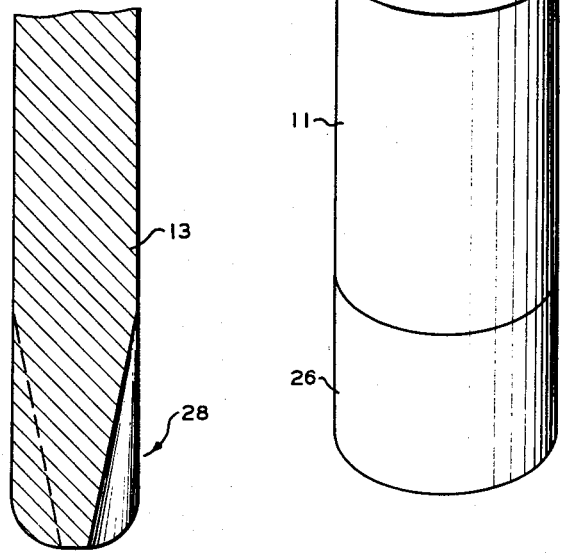
Figure 7 is a vertical cross section through an arm of the spider of the invention at the center line of one of the grooves of said arm.

Referring now to the drawings, the invention will be more fully explained. Like reference numerals are employed in the several drawings to denote like elements where possible. In Figure 1, there is shown the spider or stake holder 10 of the invention mounted in a die 11 positioned at the outlet of a material chamber 12 of a screw extrusion press. Said spider 10 is comprised of four arm members 13 which extend radially from a hub 14. More or less than four arm members can be employed. The downstream or trailing edge of each of the arm members 13 is provided with a plurality of tapered grooves 28 alternately disposed with respect to each other on opposite sides of said arm members and extending from said downstream edge to a point intermediate said downstream edge and the upstream edge of said arm members. As shown more clearly in Figure 7, said downstream edge of arms 13 is rounded. The number, depth, and length of said grooves 28 will depend upon the size and design of the spider as a whole as will be understood by those skilled in the art. A ring member 16 connects the outer ends of said arm members. Wear ring 17 is mounted on the upstream side and contiguous with said ring member 16. Said arm members 13 are recessed in the leading or upstream edge thereof, and mounted in said recesses are a plurality of breaker arms 18. It is to be noted that said breaker arms are concentrically arranged around said hub and each succeeding breaker arm in an outward direction is thicker than the preceding breaker arm. Said arm members 13 are attached to said hub 14 by means of the bolts shown and the upstream end of hub 14 is covered with a cover plate 19 held in place by means of the bolt shown so as to present a smooth upstream surface. Mandrel or stake 21 is attached to the downstream side of hub 14 by means of the bolt shown. Ring member 16 is attached to die bushing 22 by means of the bolts shown and said die bushing is attached to die holder 23 by means of the bolts shown. Die 11 thus rests in die holder 23 and is held there by means of the recessed construction shown at 24. If desired, a die extension 26 and a mandrel extension 27 can be employed on said die and said mandrel when it is desired to extrude long propellant grains.

In the operation of the apparatus illustrated in Figure 1, material chamber 12 is supplied with the material to be extruded and screw means not shown continuously forces said material through breaker arms 18 and over and around spider arms 13. The material being extruded over said spider arms 13 is, of course, parted by said arms and reunites after passing over said arms, being brought together by the restricted portions of die 11. When the arms 13 do not have grooves in the trailing or downstream edge thereof, the material in reuniting after passing said arms forms a straight line of cleavage which extends transversely of the grain to the outer circumference of said grain. When, however, said spider arms 13 are provided with the grooves 28, the material in reuniting after passing over said arms forms a non-straight line of cleavage.

The spider or stake holder of the invention is adapted to be employed in any type of extrusion press. Either a continuous screw type or piston type extrusion press, or semi-continuous or batch extrusion presses can be employed. For simplicity and convenience of illustration, the invention will be further discussed in terms as applied to a relatively small piston type continuous or batch extrusion press. The extrusion press illustrated in Figure 2 comprises a cylinder 31 having extrusion piston 32 extending therefrom, die assembly 33, and cut-off assembly 34, all held together by means of support rods 36 and cut-off support rod 36A as shown. The entire press is supported on base 37.

The control system for the press includes a hydraulic control valve 38 for said cylinder 31. Hydraulic pressure lines 39 and 41 connect with the upper and lower portions of cylinder 31 respectively. Hydraulic supply line 42 and hydraulic exhaust line 43 are also connected with valve 38. Actuation of valve 38 permits hydraulic fluid under pressure to be supplied above or below a piston within cylinder 31 and connected to extrusion piston 32, the opposite space being connected to exhaust.

Figure 2:
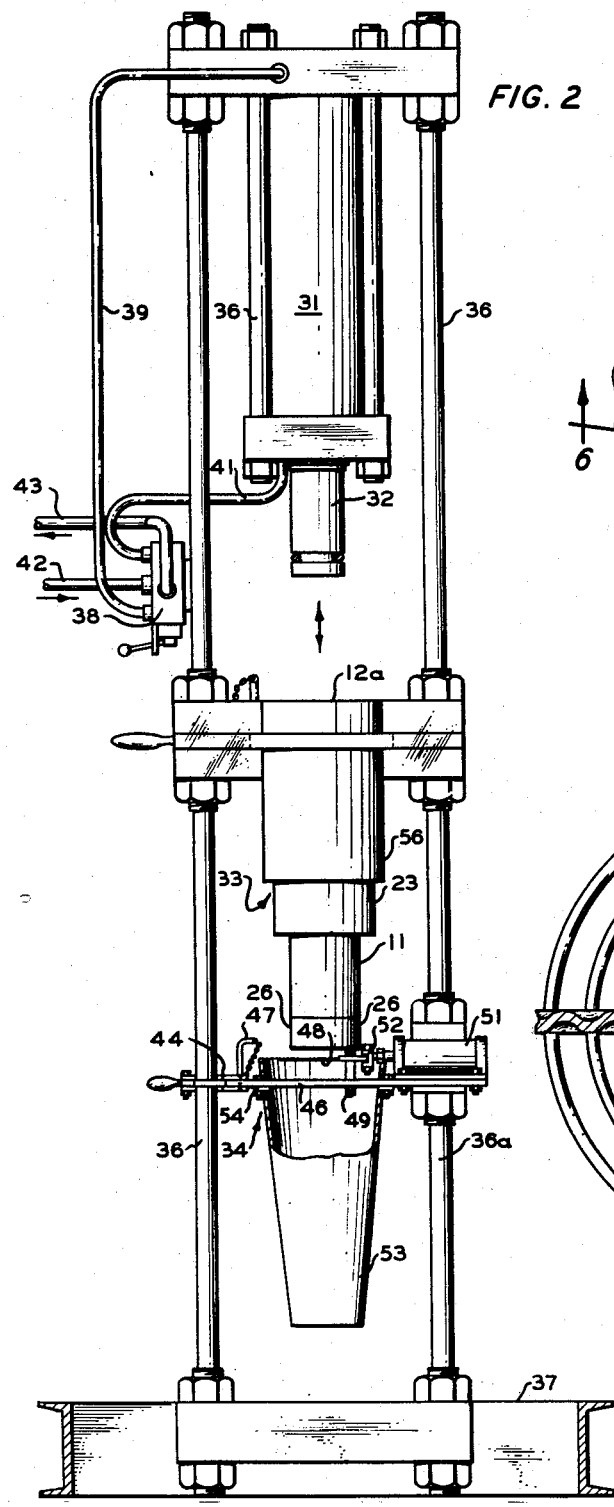
Figure 2 is an elevation of one type of propellant press in which the spider of the invention can be employed.
Figure 5:
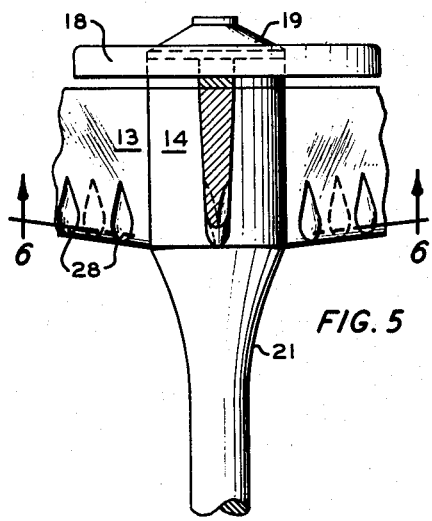
Figure 5 is an elevation showing details of the spider of the invention.
Figure 6:
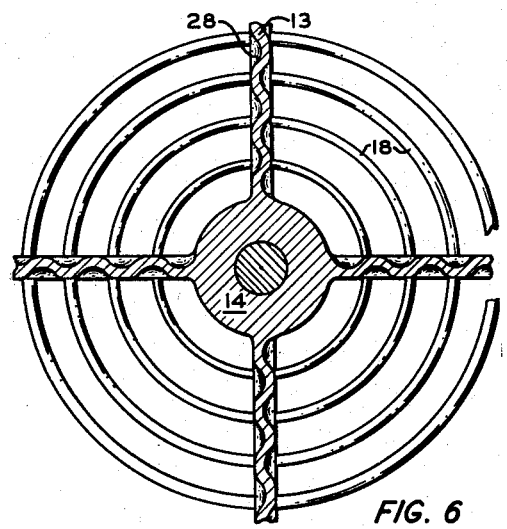
Figure 6 is a cross section along the lines 6—6 of Figure 5.

Cut-off assembly 34 is pivotably mounted on support rod 36A which permits the entire assembly to be rotated out of the way or into the operative position illustrated in Figure 2. A pivoted lock 44 is employed to hold plate 46 in position during operation, pin 47 being employed to hold said lock in position. A knife 48 is attached to plate 46 by means of vertical pivot 49 and is actuated by air cylinder 51 to which it is attached by means of air cylinder adapter 52. Air cylinder 51 is a commercial item and therefore is not described in detail. A source of air pressure (not shown) is connected with said air cylinder to permit the actuation of knife 48 when desired. Grain holder 53 is attached to plate 46 by strap 54.

Figure 3:
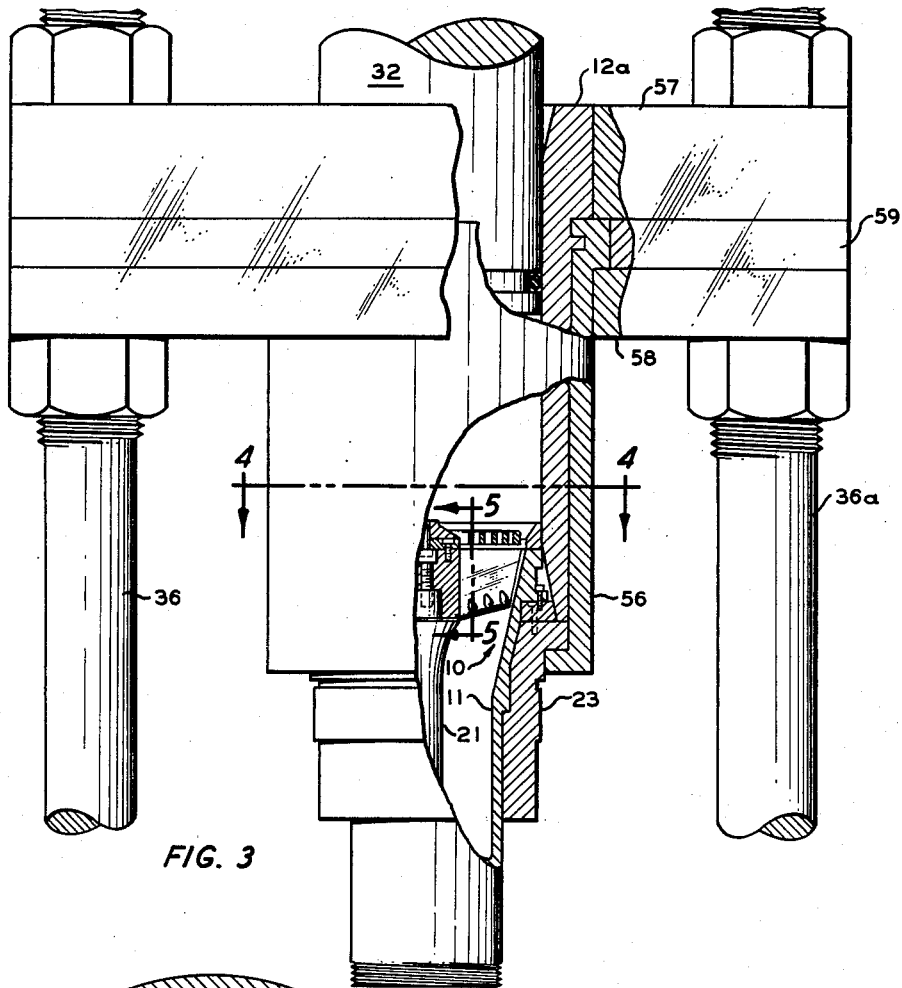
Figure 3 is a detailed view, partially in section, of a portion of the propellant press shown in Figure 2.
Figure 4:
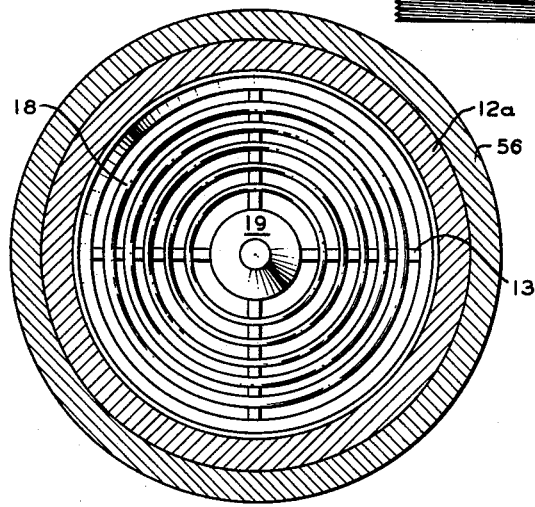
Figure 4 is a cross section along the line 4—4 of Figure 3.
Figure 8:
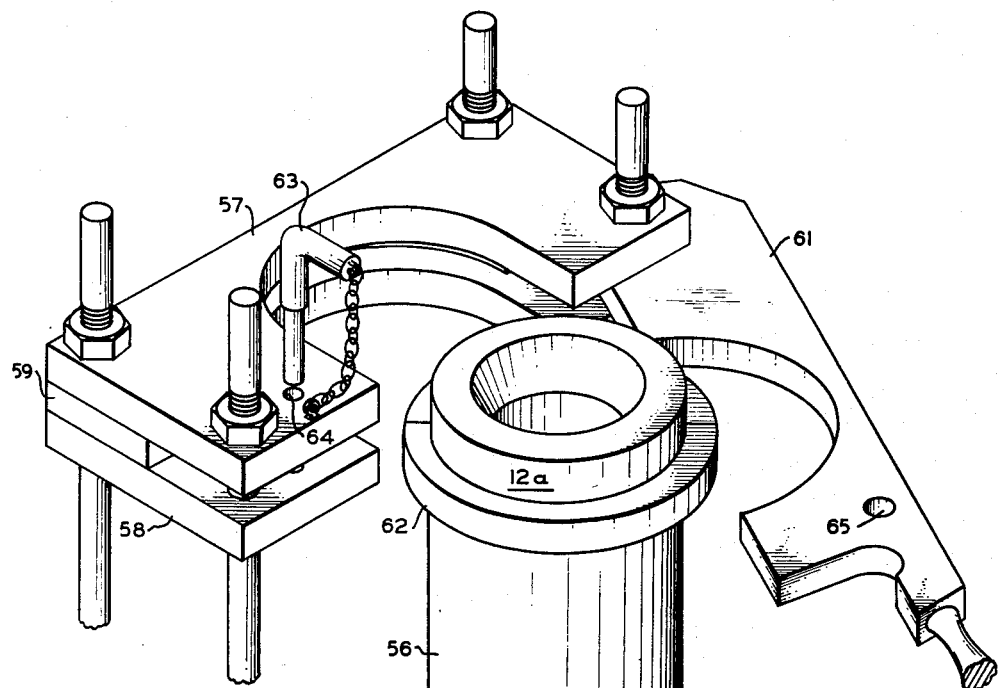
Figure 8 is a detailed view of a portion of the extrusion press shown in Figure 2.

Referring to Figures 3 and 8, there is shown in detail the method of assembly of die assembly 33. Die holder 23 is supported by die holder support 56 which is split longitudinally to permit the insertion of material chamber 12A. Spider 10 is mounted in die 11 in the same manner as described in connection with Figure 1. Die holder support 56 is in turn supported by means of an assembly comprising upper holding plate 57, lower holding plate 58, center holding plate 59 and center movable holding plate 61. Flange 62 of die holder support 56 is held between plates 57 and 58 which are spaced apart the thickness of flange 62 by center holding plate 59. Center movable holding plate 61 is pivoted on cut-off support rod 36A and can be rotated toward or away from plates 57 and 58 to lock in place or permit the removal of die holder support 56. Pin 63 is employed to be inserted through hole 64 in plate 57 which can be aligned with hole 65 in plate 61 and lock the die holder support 56 in place.

The invention is applicable to the production of perforated propellant grains from any non-homogeneous propellant material, i.e., a propellant composition comprising a binder or fuel component as the continuous phase having an oxidizer salt component dispersed therein. One class of non-homogeneous propellant materials are those comprising a solid oxidant such as ammonium nitrate or ammonium perchlorate, and a rubbery material such as a copolymer of butadiene and a vinylpyridine or other substituted heterocyclic nitrogen base compound, which after incorporation is cured by a quaternization reaction or a vulcanization reaction. Solid rocket fuel compositions of this nature and a process for their production are disclosed and claimed in copending application Serial No. 284,447, filed April 25, 1952, by W. B. Reynolds and J. E. Pritchard, assigned to the same assignee as the instant application.

In the production of such solid rocket fuel grains, it is desirable that the binder component be cured so that the resulting rocket fuel grains will have good mechanical properties such as high values of elongation and tensile strength, and low values of modulus of elasticity. It is also desirable that the rocket fuels have good burning rate and accordingly a burning rate catalyst is ordinarily incorporated into the composition.

The rubbery ploymers employed as binders in the solid rocket fuel compositions used to illustrate this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML-4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 6 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

substituent wherein R' is either hydrogen or a methyl group. That is, the substituent is either a vinyl or an alpha-methylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

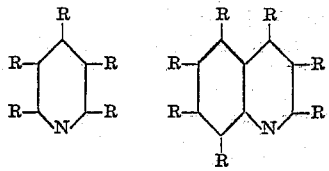

or

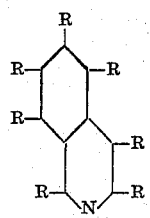

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinyl pyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline-3-vinyl-5,6-dichloroisoquinoline; 2-vinyl-6-ethoxy-7-methylquinoline; 3-vinyl-6-hydroxymethylisoquinoline; and the like.

Oxidants which are applicable in the solid rocket fuel compositions used to illustrate this invention include ammonium, alkali metal, and alkaline earth metal salts of nitric, perchloric, and chloric acids, and mixtures thereof. Ammonium nitrate and ammonium perchlorate are the preferred oxidants for use in said solid rocket fuels. Specific oxidants include sodium nitrate, potassium perchlorate, lithium chlorate, calcium nitrate, barium perchlorate, and strontium chlorate. Mixtures of oxidants are also applicable. In the preparation of the solid rocket fuel compositions, the oxidants are powdered to sizes preferably 10 to 300 microns average particle size. The amount of solid oxidant employed is usually a major amount of the total composition and is generally in the range between 50 and 90 percent by weight of the total mixture of oxidant and binder. If desired, however, less than 50 percent by weight of the oxidant can be used.

Combustion rate catalysts applicable include ammonium dichromate, metal ferrocyanides and metal ferricyanides. The complex metal cyanides are preferred. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is pigment similar to Prussian blue but having a red tint and is prepared by the oxidation of a paste of potassium ferrocyanides can also be employed. The amount of burning rate catalyst used is usually in the range of 1 to 60 parts per hundred parts of rubbery polymer with from 5 to 50 parts being most frequently preferred. The amount of combustion catalyst will usually be 0.25 to 12 parts by weight per hundred parts of oxidant and binder.

Reinforcing agents include carbon black, wood flour, lignin, and various reinforcing resins such as styrene-divinylbenzene, methyl acrylate-divinylbenzene, acrylic acid-styrene, divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

In general, any rubber plasticizer can be employed in these binder compositions. Materials such as Pentaryl A (amylbiphenyl), ParaFlux (saturated polymerized hydrocarbon), Circosol-2XH (petroleum hydrocarbon softener having a specific gravity of 0.940 and a Saybolt Universal viscosity at 100° F. of about 2000 seconds), dibutoxyethoxyethyl formal, and dioctyl phthalate are suitable plasticizers. Materials which provide rubber having good low temperature properties are preferred. It is also frequently preferred that the plasticizers be oxygen-containing materials. The amount of plasticizer used will be only that required to render the copolymer manageable during incorporation of the oxidizer and extruding the product. Ordinarily 15 to 30 parts by weight per hundred parts by weight of copolymer of plasticizer will be used although more or less can be used.

The various ingredients in the rocket fuel composition can be mixed on a roll mill or an internal mixer such as a Banbury or a Baker-Perkins dispersion blade mixer can be employed. The binder forms the continuous phase in the finished fuel composition with the oxidant as the discontinuous phase.

The curing temperature will generally be in the range between 70 and 250° F., preferably between 170 and 200° F. Cures within this range can be obtained using small amounts of sulfur within the range of 0.75 to 2.0 p.h.r. in conjunction with an accelerator such as SA 113 and other dithiocarbamate type accelerators.

The curing time must be long enough to give required creep resistance and other mechanical properties in the propellant. The time will generally range from around three hours when the higher curing temperatures are employed to 14 days when curing is effected at lower temperatures.

While this invention has been described using as the binder for rocket fuel compositions a copolymer of a conjugated diene with a polymerizable heterocyclic nitrogen base of the pyridine series, such as vinylpyridine and various alkyl-substituted derivatives, it is to be understood that the corresponding quinoline and isoquinoline compounds are also applicable, i.e., vinylisoquinolines and various alkyl-substituted derivatives of these compounds.

The following examples will serve to further illustrate the invention.

EXAMPLE I

A propellant composition containing the following ingredients was prepared:

Table I

| Ingredients | phr.[2] | Parts by Wt. |
|---|---|---|
| Bd-MVP Copolymer (90:10) 20 Mooney (ML-4). | 100 | |
| Philblack A [1] (carbon black) | 20 | |
| TP-90B (Di-(butoxyethoxyethyl)Formal) | 20 | |
| SA-113 (N,N-dimethyl-t-butylsulfenyldithiocarbamate). | 1 | |
| Sulfur | 0.75 | 16.50 (Binder) |
| Zinc oxide | 3 | |
| Flexamine (N,N'-diphenyl-p-Phenylenediamine). | 3 | |
| Aerosol OT (Dioctyl sodium sulfosuccinate). | 1 | |
| Ammonium nitrate | | 83.50 (Oxidant) |
| Milori Blue | | 2.00 (Catalyst) |
| | | 102.00 |

[1] A trademark of Phillips Petroleum Co.
[2] Part per hundred parts of rubber.

The various ingredients making up the total composition shown in Table I were thoroughly incorporated by mixing all of said ingredients so that a composition is obtained with the binder component forming the continuous phase. One group of individual grains were then extruded on an extruder equipped with the spider or stake holder of the invention. Another group of individual grains were extruded on the same extruder under essentially the same conditions but using a spider or stake holder which did not have grooves in the trailing or downstream edge of the arms. All conditions of extrusion were otherwise essentially the same.

Test specimens or strands were cut cross-wise of the area of the grain for grains extruded with and without the spider or stake holder of the invention. Reference to Figures 12 and 11 will show the relative location of these test strands with respect to the arms of the spider. Burning rate determinations were then made on said test strand specimens in accordance with the procedure given in Analytical Chemistry, 19, 630–633 (1947) except that the test strands were not restricted on the side portions as there described. Essentially, this burning rate procedure comprises measuring the time required for a predetermined length of the strand to be burned under controlled conditions of temperature and pressure.

Tables II and III below give the results of these tests. In said tables, Strand A was cut from the region downstream of a spider arm. Strand B was cut from a region downstream and between spider arms.

Table II

[Burning rate at 1000 p.s.i. and 75° F. in inches per second for grain extruded with spider having grooves in the downstream of trailing edge.]

| Sample No. | Strand-A | Strand-B |
|---|---|---|
| 1 | 0.132 | 0.130 |
| 2 | 0.131 | 0.130 |
| 3 | 0.130 | 0.129 |
| 4 | 0.132 | 0.130 |
| 5 | 0.133 | 0.131 |
| 6 | 0.134 | 0.132 |
| 7 | 0.131 | 0.129 |
| 8 | 0.130 | 0.129 |
| 9 | 0.132 | 0.130 |

Table III

[Burning rate at 1000 p.s.i. and 75° F. in inches per second for grain extruded with spider not having grooves in the downstream or trailing edge.]

| Sample No. | Strand-A | Strand-B |
|---|---|---|
| 1 | 0.143 | 0.130 |
| 2 | 0.139 | 0.128 |
| 3 | 0.141 | 0.131 |
| 4 | 0.143 | 0.130 |
| 5 | 0.145 | 0.128 |
| 6 | 0.144 | 0.129 |
| 7 | 0.140 | 0.130 |
| 8 | 0.137 | 0.131 |
| 9 | 0.138 | 0.129 |

A comparison of the data in Tables II and III shows that there is a marked difference in the burning rate of strands A and B in Table III whereas there is very little difference in the burning rates of strands A and B in Table II.

EXAMPLE II

Grains of propellant prepared as in Example I were mounted in test motors mounted on test strands, and fired. Figure 10 is a typical firing trace diagram (pressure v. time) for a propellant grain extruded when employing the spider or stake holder of the prior art, i.e., the arms of which did not have grooves in the trailing or downstream edge thereof. Figure 9 is a typical firing trace diagram (pressure v. time) of a grain extruded when employing the stake holder of the invention, i.e., one having grooves in the trailing or downstream edge of the arms thereof. The ends of both grains were chamfered.

A comparison of Figures 9 and 10 shows that in Figure 10 there is obtained during the first few seconds of the burning, a rapid introduction of new burning surface which causes a build-up to a pressure higher than that normally desired. Some of this introduction of new burning surface is of course due to the chamfer on the end of the grain. However, a comparison of the first few seconds of burning in Figure 10 with the first few seconds of burning in Figure 9, shows there is a much more rapid introduction of new burning surface in Figure 10 than in Figure 9. This was due to the increased burning rate in the regions of the lines of cleavage in the grain of Figure 10 which caused the formation of V-shaped grooves on the surface of the grain. The ends of both grains were chamfered in the same manner and to the same degree. It will also be noted that the duration of burning in Figure 9 is approximately 25% greater than that in Figure 10. It should also be noted that the period between $T_b$ and $T_c$, i.e., the period between substantially total burn-out and total burn-out in Figure 10 is considerably greater than in Figure 9. It is believed that this difference is due to premature burn-out of the propellant in Figure 10 along the cleavage lines which results in more splintering of the grain, i.e., when the grain is substantially completely burned out as indicated by the point $T_b$, there remains splinters of the grain which caused continued burning until the point $T_c$ is reached.

While the invention has been described as applied to the extrusion of one propellant composition, it should be understood that it is not limited thereto. As stated above, the invention can be applied to the extrusion of any non-homogeneous propellant material wherein the binder or fuel component is the continuous phase and the oxidizer component is dispersed in said continuous phase.

While rounded grooves on the downstream or trailing edge of the arms of the spider of the invention have been described and are preferred, it is within the scope of the invention to employ grooves having substantially straight lines. However, rounded grooves are preferred because, as will be understood by those skilled in the art, the interlocking action of the parted material in reuniting after passing the arms of the spider is much smoother, and more uniformly complete when round grooves are used than when grooves having straight lines are used.

Various modifications and embodiments of the invention will be apparent to those skilled in the art in view of the above disclosure and the attached drawings. Such modifications are believed to be within the spirit and the scope of the invention.

I claim:

1. In a process for extrusion molding a solid plastic heterogeneous propellant material comprised of a rubber fuel component and an oxidizer component uniformly dispersed in said fuel component into a grain having an internal perforation wherein, said material is extruded through a die chamber having a mandrel positioned and held therein by means of a spider, said material is parted as it flows around the arms of said spider and reunites forming a straight line of cleavage between said previously parted portions of said material, and where orientation of the particles of said oxidizer component occurs in a region around said cleavage line causing increased burning rate of propellant in said region, the method of preventing said orientation of oxidizer particles so as to obtain a propellant having a substantially uniform burning rate in all regions thereof which comprises; parting said material as it flows around said arms into adjoining portions having faces formed of arcuate shaped grooves, said grooves in said adjoining sections being alternately disposed with respect to each other; and reuniting said parted portions of said material in an interlocking manner to form a uniform non-straight line of cleavage made up of arcuate shaped sections in which there is no plane of oriented oxidizer particles.

2. An extrusion machine for extrusion molding of a solid plastic heterogeneous propellant material comprising a rubber fuel component having an oxidizer salt uniformly dispersed therein, which machine comprises, in combination: a die; means for forcing said propellant through said die; a mandrel; and means for holding said mandrel within said die; said mandrel-holding means comprising: a hub; a plurality of arm members each extending radially from said hub, each said arm member having an upstream edge and a rounded downstream edge; a plurality of arcuate shaped tapered grooves alternately disposed with respect to each other in the lower portion of each side of each said arm member, said grooves tapering and extending from said downstream edge to a point intermediate said downstream edge and said upstream edge; a ring member connecting the outer ends of said arm members; means for attaching said mandrel to said hub; and a plurality of breaker rings of increasing diameter concentrically disposed in spaced apart relationship around said hub and mounted in recesses in the upstream edge of said arm members, said breaker rings extending in an upstream direction from said upstream edge of said arm members and each successive breaker ring in an outward direction from said hub being thicker than the preceding breaker ring.

3. A process for extrusion molding a solid plastic heterogeneous material comprised of a rubber fuel component and an oxidizer component uniformly dispersed in said fuel component into a grain having an internal perforation therein and a uniform burning rate, which process comprises the steps of: extruding said material through a die chamber having a mandrel positioned and held therein by means of a spider comprised of a plurality of arm members extending radially from a hub; parting said material as it flows around said arms into adjoining portions having faces formed of arcuate shaped grooves, said grooves in said adjoining sections being alternately disposed with respect to each other; and reuniting said parted portions of said material in an interlocking manner to form a uniform non-straight line of cleavage made up of arcuate shaped sections.

References Cited in the file of this patent

UNITED STATES PATENTS

| | | |
|---|---|---|
| 134,885 | Haws et al. | Jan. 14, 1873 |
| 2,363,261 | Ritter | Nov. 21, 1944 |
| 2,392,190 | Ritter | Jan. 1, 1946 |
| 2,462,808 | Donner | Feb. 22, 1949 |
| 2,597,638 | Higbie | May 20, 1952 |
| 2,817,113 | Fields | Dec. 24, 1957 |